Apr. 3, 1923.
I. V. LUCAS
1,450,504
VEHICLE JACK
Filed June 30, 1921
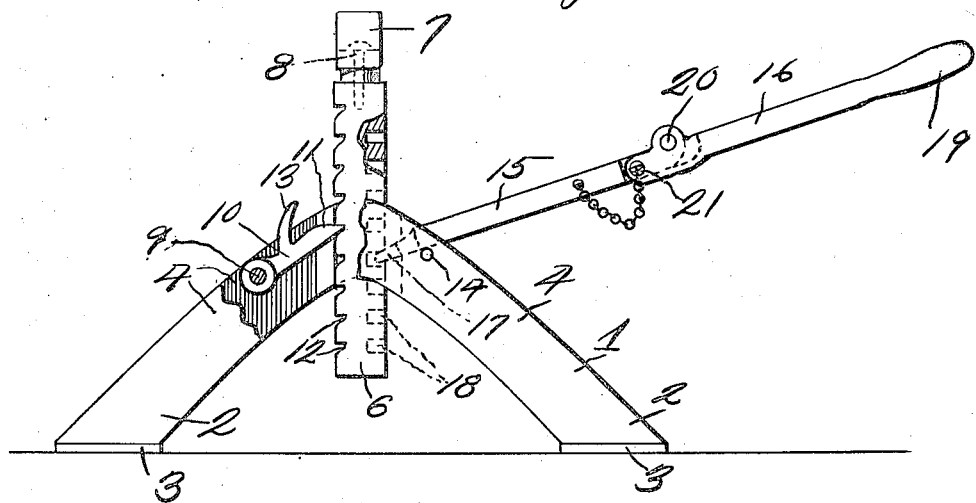
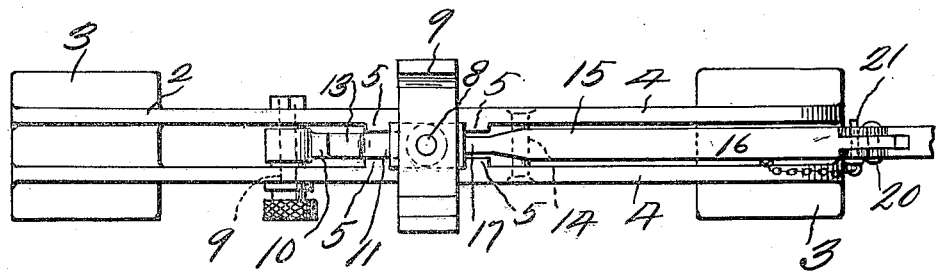
Inventor
I. V. Lucas
By Patented Apr. 3, 1923.

1,450,504

UNITED STATES PATENT OFFICE.

IRVING V. LUCAS, OF MUSKOGEE, OKLAHOMA.

VEHICLE JACK.

Application filed June 30, 1921. Serial No. 481,539.

*To all whom it may concern:*

Be it known that I, IRVING V. LUCAS, a citizen of the United States, residing at Muskogee, in the county of Muskogee, State of Oklahoma, have invented a new and useful Vehicle Jack; and I do hereby declare the following to be a full, clear, and exact description of the invention, such as will enable others skilled in the art to which it appertains to make and use the same.

The invention relates to vehicle jacks and has for its object to provide a device of this character comprising a base arching upwardly and formed from spaced bars between which bars a vertically moved notched bar is slidable. Also to provide a gravity actuated pawl pivoted between the spaced bars of the base and cooperating with a plurality of notches on one side of the vertically movable and guided bar.

A further object is to provide a foldable handle, which handle when extended may be disposed on a transversely disposed pin in the base and utilized in cooperating with a plurality of apertures in the vertically movable member in such a manner that said vertically movable member may be intermittently forced upwardly.

With the above and other objects in view the invention resides in the combination and arrangement of parts as hereinafter set forth, shown in the drawings described and claimed it being understood that changes in the precise embodiment of the invention may be made within the scope of what is claimed without departing from the spirit of the invention.

In the drawings:—

Figure 1 is a side elevation of the jack, part being broken away to better illustrate the structure.

Figure 2 is a top plan view of the jack.

Referring to the drawings, the numeral 1 designates an arched base comprising downwardly extending legs 2, which are provided with ground engaging portions 3 adapted to engage the ground. The base is preferably in a single piece and provided with spaced parallel bars 4, the inner faces of which bars at points centrally thereof are provided with parallel integral spaced ribs, which ribs form guides for the vertically movable lifting bar 6. The lifting bar 6 is preferably rectangular shaped as shown and is provided with an axle engaging member 7 pivoted as at 8 to its upper end, which axle engaging member engages under an axle during a vehicle raising operation.

Pivotally mounted on a transversely disposed pin 9 which extends the bars 4 is a gravity actuated dog 10, which dog has its nose 11 disposed between oppositely disposed ribs 5 and cooperate with notches 12 in one side of the vertically movable bar 6. It will be seen that as the vertically movable bar 6 is forced upwardly the dog 10 will cooperate with the teeth 12 in such a manner as to hold bar 6 in any position to which it may have been moved. Dog 10 is provided with a finger engaging member 13, by means of which finger engaging member the dog may be easily moved out of cooperative relation to the notches 12 for lowering the bar or for any other purpose.

Extending transversely through the bars 4 on the opposite side of the vertically movable bar from which the dog 10 is located is a pin 14, which pin forms a fulcruming point for the end 15 of the foldable lever 16. When the lever 16 is disposed as shown at figure 1, its reduced end 17 is placed in any one of a series of a plurality of apertures 18 and when the handle end 19 of the lever 16 is forced downwardly, the vertically movable bar 6 will be moved upwardly. During this operation the gravity actuated dog 10 will move out of one of the notches 12 and enter the notch below. The above operation is repeated until the bar 6 has been forced upwardly the desired distance.

The lever 16 is formed in sections hingedly connected together at 20 and held in extended position as shown in figure 1 by means of a pin 21. When said pin 21 is removed the lever may be folded for allowing the same to be stored in a small space, and for also allowing the device as a whole to be easily stored. It will also be seen that the bar 6 may be removed so that the device may be easily stored.

From the above it will be seen that a vehicle is provided which is simple in construction, parts reduced to a minimum and the device so constructed that it may be formed into a compact package for storage purposes.

The invention having been set forth what is claimed as new and useful is:—

A vehicle jack comprising a base, said base being upwardly arched and formed from parallel spaced bars, the inner faces of said bars being provided with vertically disposed integral guide ribs, a vertically disposed and movable axle engaging bar slidable between said lugs, a dog pivoted between the spaced parallel bars and cooperating with a plurality of notches in one side of the axle engaging bar, a transversely disposed pin extending the spaced parellel bars on the opposite side of the vertically movable bar from the side on which the dog is disposed, a detachable and removable lever having a fulcrum on the transversely disposed pin, the nose of said lever cooperating with a plurality of apertures in the vertically movable bar, whereby said bar may be intermittently forced upwardly, the ends of the base being disposed a substantial distance outwardly from the pivotal points of the dog and transversely disposed pin.

In testimony whereof I have signed my name to this specification in the presence of two subscribing witnesses.

IRVING V. LUCAS.

Witnesses:
  MRS. G. G. BEN JACKSON,
  A. J. TURNER.